United States Patent [19]
Nukui

[11] Patent Number: 6,078,347
[45] Date of Patent: Jun. 20, 2000

[54] LASER SCAN BASED RECORDING APPARATUS

[75] Inventor: Makoto Nukui, Tokyo, Japan

[73] Assignee: Asahi Kogaku Kogyo Kabushiki Kaisha, Tokyo, Japan

[21] Appl. No.: 08/966,564

[22] Filed: Nov. 10, 1997

[30] Foreign Application Priority Data

Nov. 11, 1996 [JP] Japan .................................. 8-298345

[51] Int. Cl.⁷ ..................................................... G01J 1/32
[52] U.S. Cl. ........................ 347/246; 347/247; 347/253; 347/236; 347/237; 250/205; 250/236
[58] Field of Search .................................. 347/246, 247, 347/250, 260, 261, 255; 250/236, 205

[56] References Cited

U.S. PATENT DOCUMENTS

| | | | |
|---|---|---|---|
| 4,201,944 | 5/1980 | Beunders | 455/155.1 |
| 4,713,672 | 12/1987 | Horihata et al. | 347/246 |
| 5,001,341 | 3/1991 | Negishi | 250/235 |
| 5,369,423 | 11/1994 | Hunter et al. | 347/255 |
| 5,461,414 | 10/1995 | Honda et al. | 347/250 |
| 5,498,869 | 3/1996 | Appel et al. | 250/236 |

FOREIGN PATENT DOCUMENTS

| | | |
|---|---|---|
| 53-37029 | 4/1978 | Japan . |
| 4162013 | 6/1992 | Japan . |

*Primary Examiner*—N. Le
*Assistant Examiner*—Hai C. Pham
*Attorney, Agent, or Firm*—Greenblum & Bernstein, P.L.C.

[57] ABSTRACT

In a laser scan based recording apparatus, laser light from a measuring laser diode is directed to one reflecting surface of a polygonal mirror. The reflected light is detected with a measuring photodiode. The reflectance of laser light is calculated from the detection output of the measuring photodiode and a reference voltage is generated. When the reflecting surface has rotated to the position where the laser light from laser light source scans a photoreceptor drum, the emission output of the laser light source is controlled by a laser output control circuit on the basis of the generated reference voltage. Despite variation in reflectance among the multiple reflecting surfaces of the polygonal mirror, the photoreceptor is scanned with a constant optical intensity of laser light. Since automatic power control is performed at all times, overdriving of the laser diode is effectively prevented to protect it against breakdown, producing consistent and highly reliable laser power control.

12 Claims, 5 Drawing Sheets

LASER SCAN BASED RECORDING APPARATUS

BACKGROUND OF THE INVENTION

The present invention relates to a laser scan based recording apparatus for use with laser printers and the like to record information by causing laser light to scan the photosensitive surface of a photoreceptor with a rotating polygonal mirror. The invention relates specifically to an apparatus for adjusting the optical intensity of laser light being applied to the photosensitive surface of the photoreceptor.

Figure 4:
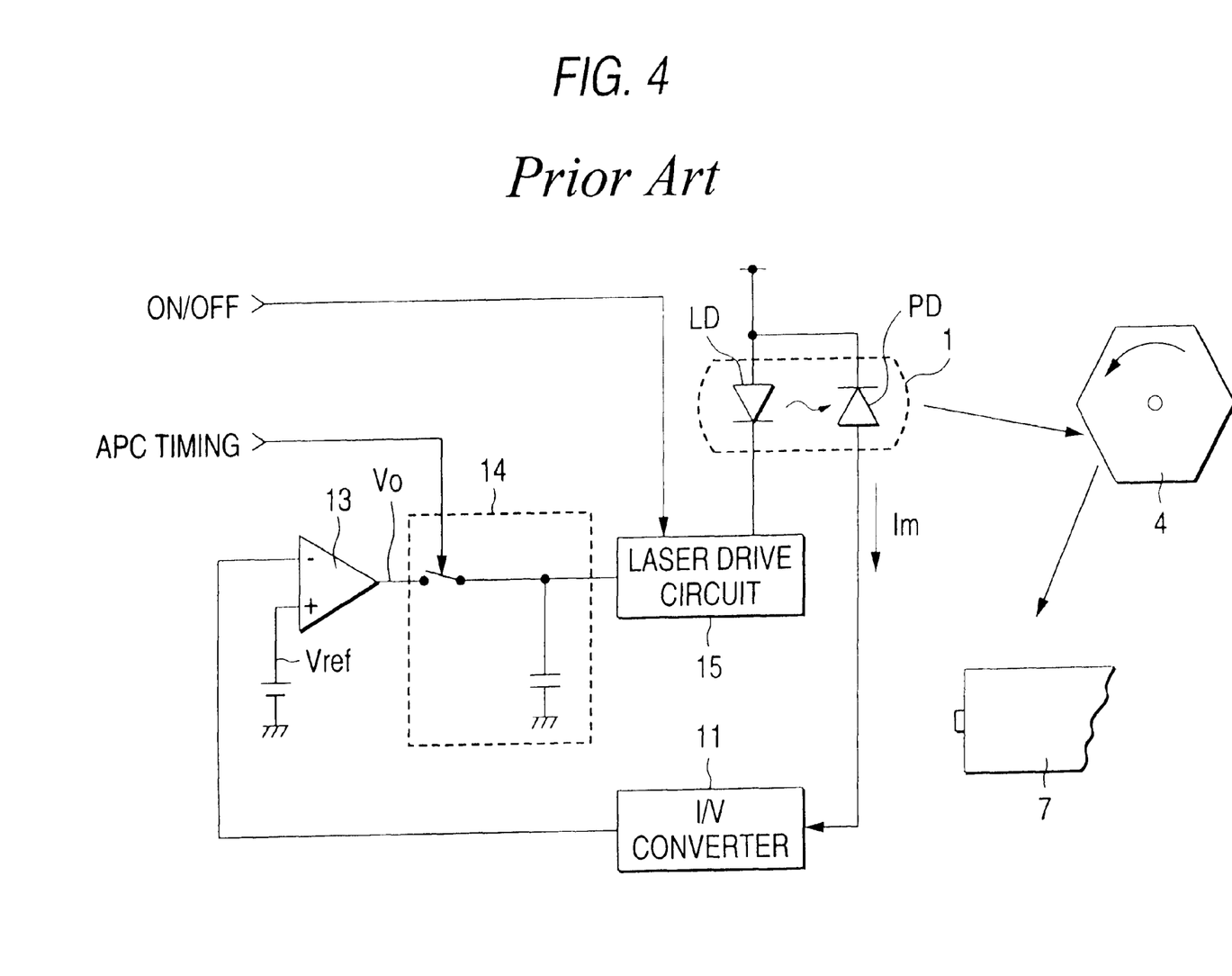
FIG. 4 is a circuit diagram of an exemplified APC circuit.

Laser scan based recording apparatus of the type contemplated by the invention are adapted to be such that laser light emitted from a laser light source is projected on a reflecting surface of a rotatably driven polygonal mirror. As the polygonal mirror revolves, the direction of the laser light reflected from the reflecting surfaces of the polygonal mirror is changed so as to scan the photosensitive surface of a photoreceptor with the reflected light, thereby drawing an image in lines. In order to attain a uniform image density, the optical intensity of the laser light issuing from the laser light source (the intensity is hereunder referred to as "laser power") must be controlled at a specified level. To this and, the intensity of the laser light issuing from the laser light source is detected and the laser power is controlled on the basis of the detected value. This technique is generally called "APC (automatic power control)" and its operational concept is shown in FIG. 4. The optical intensity of laser light emitted from a laser diode LD in a laser light source 1 is detected with a monitoring photodiode PD. The resulting detection current Im is converted to voltage in a I/V (current/voltage) converter 11, followed by comparison with a reference voltage Vref in a comparator 13. The resulting comparison output Vo is held in a sample and hold circuit 14, from which it is fed into a laser drive circuit 15 capable of V/I (voltage/current) conversion. In the laser drive circuit 15, the current to drive the laser diode LD is controlled such that the laser power is controlled to a specified value.

A problem with this approach of controlling the laser power to a specified level is that if the intensity of laser light varies due to various factors that occur in the optical path from the laser light source to the photosensitive surface, it becomes difficult to ensure the desired uniform image density. One such factor is the variation in the reflectance of laser light from the individual reflecting surfaces of the polygonal mirror 4. If different reflecting surfaces produce different reflectances of laser light, the intensity of the laser light reflected form the successive reflecting faces also varies, causing differences in the densities of the scan lines created by the laser light reflected from the successive reflecting surfaces. The reflecting surfaces of the polygonal mirror are initially designed to reflect the incident light at the same reflectance. However, as the polygonal mirror revolves at high speed, dust and other particles in air collect on the reflecting surfaces. Because of this, and other reasons, the reflectance of laser light from each reflecting surface will vary over time, eventually causing variations of about 3 to 4% in the reflectances of laser light from the respective reflecting surfaces. Such variations in reflectance are not a big problem in binary level recording which forms an image by turning on and off the laser light. On the other hand, with color printers or the like which require the production of a halftone image, density control is necessary for providing at least 256 levels of contrast. To this need, the variation in the reflectance of laser light should not exceed 1%.

In order to deal with the problem of variation in the reflectance of laser light from each reflecting surface of the polygonal mirror, the detection of the intensity of laser light in the practice of APC may be performed in a position downstream of the polygonal mirror, preferably in the neighborhood of the photosensitive surface of the photoreceptor. In this way, the optical intensity of the laser light actually reflected by the polygonal mirror is detected and by controlling the laser power on the basis of the detection output. Uniformity can then be assured in the profile of laser light intensity on the photosensitive surface. For example, Unexamined Published Japanese Patent Application Nos. 37029/1988 and 162013/1994 propose a beam recording apparatus which detects the intensity of laser light just before it scans the photosensitive surface of a photoreceptor drum, and controls the laser power on the basis of the detected value of laser light intensity. More specifically, the optical intensity output of laser light is detected with a photosensor provided in the neighborhood of the photoreceptor drum. Its peak is held and fed back to an APC circuit, which uses the thus held sensor output to control the laser light modulator, as well as the semiconductor laser generator serving as the laser light source.

According to the technique just described above, the laser power control is solely based on the laser light intensity detected with the photosensor provided just before the photoreceptor drum. This occasionally causes the following problem. Prior to the projection of laser light on the photosensor as in the initial sate or if the laser light fails to be projected on the photosensor due, for example, to a vertical offset in laser scanning, the output of the photosensor is almost zero, so the APC circuit will control the laser power toward a maximum level. This causes the laser light source and the optical modulator to operate with a maximum level of laser power, as is typically the case of failure of the laser light to be projected on the photosensor. If the laser light source is continuously driven to produce a maximum power, the semiconductor laser generator may potentially break due to the overdrive. In the other case, the repeated variation in laser power from the maximum to a specified level eventually shortens the life of the semiconductor laser generator.

SUMMARY OF THE INVENTION

An object, therefore, of the present invention is to provide a laser scan based recording apparatus that is protected not only against the variation in draw density due to the variation in the reflectance of laser light by each reflecting surface of the polygonal mirror, but also against overdriving of a laser light source and the variation in laser power.

The stated object of the invention is attained by a laser scan based recording apparatus in which laser light emitted from a laser light source is reflected by a polygonal mirror to scan a photoreceptor. A mechanism measures the reflectance of laser light for each of the reflecting surfaces of the polygonal mirror and generates a reference voltage associated with the measured reflectance. An emission output control mechanism controls the emission output of the laser light source on the basis of the generated reference voltage when laser light is reflected at the reflecting surface for which the reflectance of laser light has been measured.

In an exemplary case, the laser scan based recording apparatus includes a laser diode. A rotatably driven polygonal mirror having a plurality of reflecting surfaces directs the laser light from said laser diode to scan a photoreceptor. A light emitter projects reflectance measuring light on any one of said reflecting surfaces. A light receiver detects the measuring light reflected from the reflecting surface. A mechanism generates a reference voltage associated with the reflectance for the reflecting surface from the measuring light received by the light receiver. A laser output control circuit controls the emission output of the laser diode on the basis of the generated reference voltage when laser light is scanned at said reflecting surface.

In another exemplary case, the laser output control circuit includes a monitoring photodiode for detecting the optical intensity of the laser light emitted from the laser diode. An error comparator compares the detection output of the monitoring photodiode with a reference voltage. A laser drive circuit controls the drive current to be fed to the laser diode in association with the error voltage.

In yet another exemplary case, the reference voltage generating mechanism includes a circuit for comparing the detection output of the light receiver with a reference value and performing a predetermined calculation, a mechanism which stores the value obtained by the calculation, and a mechanism which reads the stored value synchronous with the rotation of the polygonal mirror and outputs it as a reference voltage.

In a further exemplary case, the reflecting surface for which the reflectance of laser light is to be measured is positioned at least one surface upstream in the direction of rotation with respect to the reflecting surface which is at the laser light scanning rotational position, and is provided with a mechanism which outputs the scan timing of said laser light. The reference voltage generator circuit is so adapted that the reference voltage is output to the laser output control circuit at such a time that the reflecting surface for which the reflectance of laser light has been measured on the basis of the scan timing output is rotated to the scan position.

The present disclosure relates to subject matter contained in Japanse patent application No. 8-298345 filed on Nov. 11, 1996 which is expressly incorporated herein by reference in its entirety.

DESCRIPTION OF THE LASER SCAN BASED RECORDING APPARATUS

Figure 1:
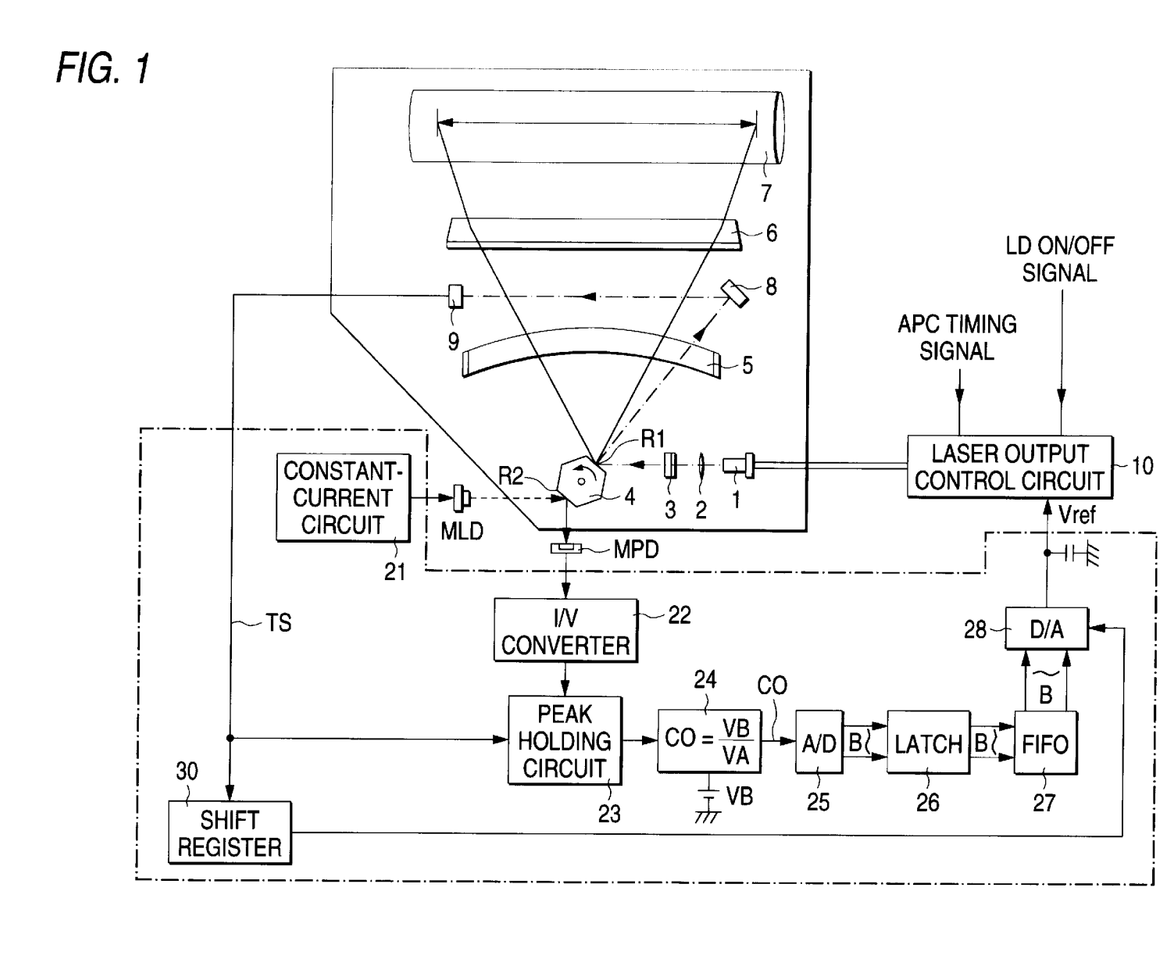
FIG. 1 is a diagram showing the general layout of a laser scan based recording apparatus.

FIG. 1 is a conceptual diagram showing the general layout of a laser scan based recording apparatus. A semiconductor laser 1 as a laser light source emits laser light. A collimator lens 2 produces a parallel beam of the laser light. A cylindrical lens 3 shapes the laser beam. Lines 2 and 3 are disposed in the optical path of the laser light. The shaped laser beam is projected on a polygonal mirror 4. The polygonal mirror 4 is formed as a hexagonal prism, and its six lateral sides are each provided with a reflector. The polygonal mirror 4 in driven to rotate counterclockwise (as indicated by the arrow) rapidly about the central axis. The laser light reflected from the polygonal mirror 4 is transmitted through an fθ lens 5 with the direction of reflection being synchronous with the rotation of the polygonal mirror 4. The transmitted laser light is reflected by a reflector mirror 6 and projected on the photosensitive surface of a photoreceptor drum 7 such that it is scanned in the main scaning direction. The angular velocity of deflection of the reflected laser light is corrected by the fθ lens 5 to provide a uniform scan speed on the photoreceptor drum 7. The photoreceptor drum 7 is rotated about its own axis, thereby effecting auxiliary scan. Further, a reflector mirror 8 is provided outside the image drawing region of the photoreceptor drum 7 and in a position close to the end where scanning with the laser light starts. A photosensor 9 for detecting the laser light reflected from the mirror 8 to produce a scan timing signal is provided in a position which is opposite to said mirror 8 in the axial direction of the photoreceptor drum 7.

Figure 2:
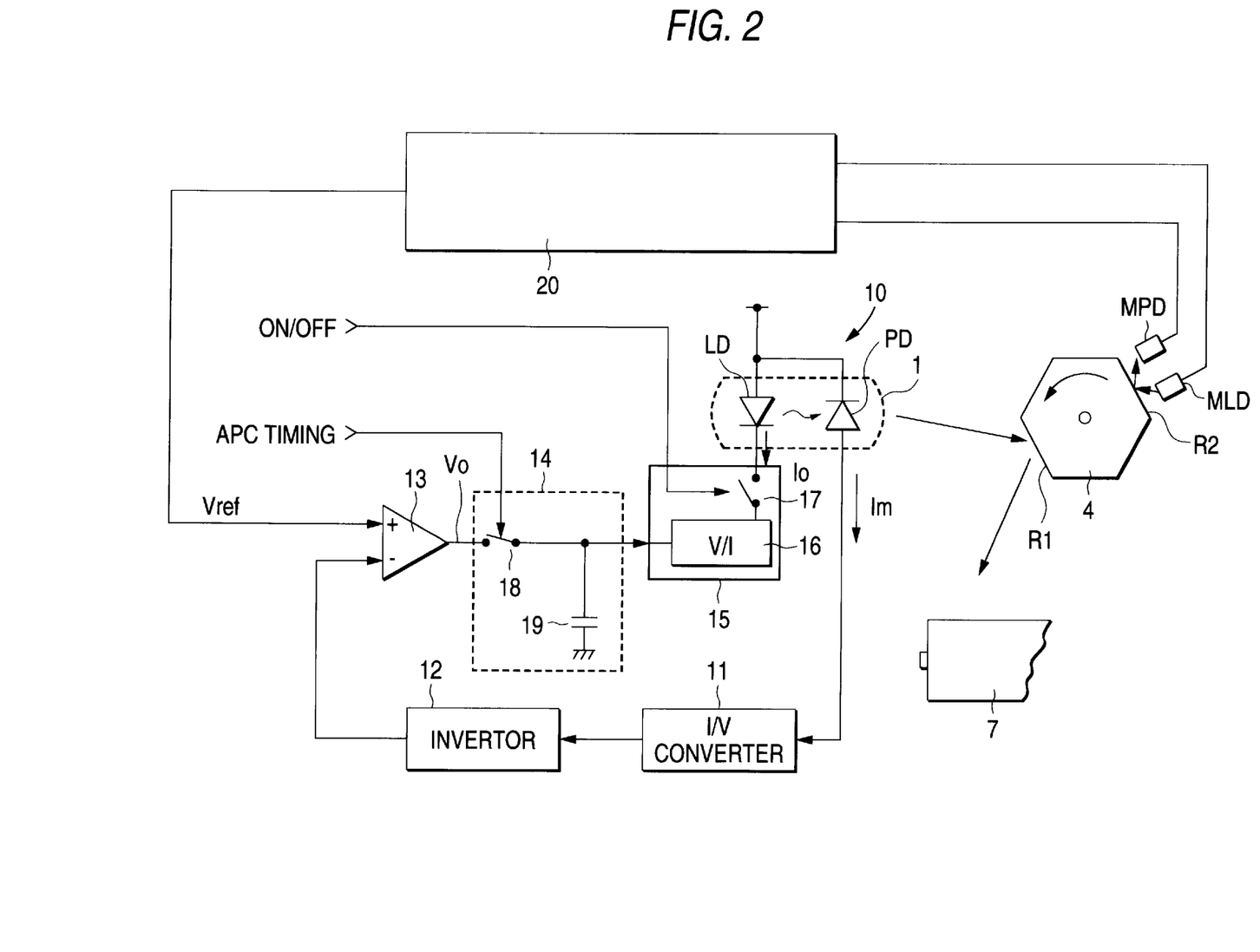
FIG. 2 is a circuit diagram showing the laser output control circuit in the apparatus.

As shown in FIG. 2, the laser light source 1 is an integral assembly of the laser diode LD and the monitoring photodiode PD. The optical intensity of laser light emitted from the laser diode LD in detected with the monitoring photodiode PD. On basis of the resulting detection output, a laser output control circuit 10 controls the emission output of the laser diode LD. In general, the photodiode PD is located behind the laser diode LD, i.e., at a position opposite from the polygonal mirror 4 with respect to the laser diode LD, to receive the back laser light from te laser diode LD. In addition, as shown in FIG. 1, a reference voltage generator circuit 20 is provided for the reflecting surface of the polygonal mirror 4 which is diametrically opposite to the reflecting surface at which the laser light is reflected for scanning; the circuit 20 measures the reflectance of laser light for said diametrically opposite reflecting surface and generates a reference voltage for the laser output control circuit 10 on the basis of the measured reflectance. Provided for the reference voltage generator circuit 20 are a measuring laser diode MLD for projecting light (laser light for measurement in this apparatus) on one of the reflecting surfaces of the polygonal mirror 4, and a measuring photodiode MPD for receiving the measuring laser light reflected from that reflecting surface.

The reference voltage generator circuit 20 includes a constant-current circuit 21 for supplying the measuring laser diode MLD with a constant current to activate it for emitting a given optical intensity of laser light, an I/V converter 22 for performing I/V conversion on the detection current representing the optical intensity of measuring laser light detected with the measuring photodiode MPD, a peak holding circuit 23 for holding the peak of the voltage from the I/V converter 22, and a comparing/computing device 24 for comparing the held voltage with a preset constant voltage to calculate the reflectance of laser light for the reflecting surface of interest. The reference voltage generator circuit 20 also includes an A/D converter 25 with which the reflectance of laser light for the reflecting surface (which has been calculated with the device 24) is converted to digital data of a predetermined bit number (8 bits in this apparatus), a latch circuit 26 for latching the digital data from the A/D converter 25, a FIFO memory 27 for storing the latched digital data in an ordered sequence, and a D/A converter 28 with which the digital data read out of the FIFO memory 27 in an ordered sequence is converted to an analog signal. The resulting voltage is output as analog signal to the laser output control circuit 10 as a reference voltage Vref. It should be noted that the photosensor 9 detects a scan timing signal TS, which is input to the peak holding circuit 23 and used as a timing signal for the peak holding operation. The scan timing signal TS in also input to a shift register 30, where it is delayed by a preset shift number and thence input to the D/A converter 28 in the reference voltage generator circuit 20 for use as an output timing signal in the D/A converter 28.

Details of the laser output control circuit 10 are shown in FIG. 2. An I/V converter 11 converts the detection current based on the optical intensity of the laser light from the laser diode LD which has been detected with the monitoring photodiode PD. An inverter 14 inverts the polarity of the voltage from the I/V converter 11. A comparator 13 compares the inverted voltage with a reference voltage Vref input from the reference voltage generator circuit 20. A sample and hold circuit 14, in which a comparison voltage Vo an the comparison output of the comparator 13 is sampled and held in response to an APC timing signal. A laser drive circuit 15 having a V/I converting capability generates a drive current to the laser diode LD on the basis of the thus held comparison voltage. The laser drive circuit 15 includes a V/I converter 16 for performing the above-described V/I conversion, and a drive switch 17 for turning on and off the drive current to the laser diode in response to signals for turning on and off the emission of laser light from the laser diode. It should be noted that the APC timing signal and the signals to turn on and off the laser diode LD are output from a central processing unit (not shown) synchronous with the rotation of the polygonal mirror. The sample and hold circuit 14 includes a sampling switch 18 and a holding capacitor 19.

The procedure of APC performed by the laser scan based recording apparatus thus constructed will be described hereafter. The central processing unit (not shown) outputs an APC timing signal and on/off signals synchronous with the rotating cycle of the polygonal mirror. In response to these signals, the laser output control circuit 10 turns on the drive switch 17. The laser drive circuit 15 supplies a drive current Io to the laser diode LD which, in turn, is activated for laser light emission. The laser light emitted from the laser diode LD is received by the monitoring photodiode PD and the detection current Im representing the optical intensity of that laser light is converted to voltage in the I/V converter 11, inverted in polarity by the inverter 12, and compared with the reference voltage Vref in the comparator 13. As the result of this comparison with the reference voltage, a comparison voltage Vo representing the difference between the two inputs is output. In response to the APC timing signal, the comparison voltage Vo is sampled and held in the sample and hold circuit 14 at the APC timing. The thus held comparison voltage is input to the laser drive circuit 15, where it is subjected to V/I conversion and thence output as a drive current Io. In this way, the drive current from the laser drive circuit 15 is controlled by the detection current Im from the monitoring photodiode PD such that the emission output of the laser diode LD is subject to feedback control to provide an optical intensity associated with the reference voltage Vref.

The thus controlled laser light emission from the laser diode LD in projected onto a reflecting surface R1 of the polygonal mirror 4 which has rotated to receive the laser light from the laser diode LD (said surface is hereunder referred to as "the reflecting surface in scan position"), and the reflected laser light passes through the fθ lens 5 to scan the photoreceptor drum 7 via the reflecting mirror 6, as already described above. On the other hand, at a timing prior to the scanning of the photoreceptor drum 7, the laser light reflected from the reflecting surface in scan position R1 is reflected by the reflecting mirror 8 and received by the photosensor 9 which, in turn, outputs a scan timing signal TS. Hence, the rotational position of the polygonal mirror can be recognized with reference to this scan timing signal. It should also be noted the scan timing signal from the photosensor is used as a sync signal in the main scaning direction, which provides a reference for the various timing signals coming from the central processing unit.

The reference voltage generator circuit 20, synchronous with the rotation of the polygonal mirror 4 but prior to the emission of laser light from the laser diode LD by at least a time period corresponding to the rotation of one reflecting surface of the polygonal mirror (i.e., 60 degrees), the constant-current circuit 21 activates the measuring laser diode MLD to emit laser light onto one of the reflecting surfaces other than the reflecting surface in scan position R1 (said one reflecting surface in hereunder referred to as "the reflecting surface in measure position"). The laser light emitted from the measuring laser diode MLD is projected on the reflecting surface R2 located diametrically opposite to the reflecting surface in scan position R1. Since the polygonal mirror 4 has six reflecting surfaces, the reflecting surface in measure position R2 in delayed in scan timing from the reflecting surface in scan position R1 by three scan cycles, or three scan timing signals TS. The laser light projected on the reflecting surface in measure position R2 is reflected by that surface, with the reflected laser light being received by the measuring photodiode MPD and supplied to the I/V converter 22 which detects the laser light as a voltage. The detection voltage VA is held in the peak holding circuit 23 at the timing determined by the scan timing signal. The held voltage VA is compared with a constant voltage VB in the comparing/computing device 24. The constant voltage VB is so set that when the reflecting surface in measure position R2 has a preset specific reflectance of laser light, the value C obtained by dividing constant voltage VB by the voltage VA obtained at the reception of the reflected measuring laser light (C=VB/VA) is equal to a preset value CO. Therefore, if the reflecting surface in measure position R2 has a reflectance of laser light greater than a specified value, the computed value C is smaller than the set value CO. Conversely, if the reflecting surface in measure position R2 has a reflectance smaller than the specified value, C is greater than CO. In either case, the computed value C is output to the A/D converter 25.

In the A/D converter 25, the computed value C is converted to 8-bit digital data, which is stored in the FIFO memory 27 via the latch circuit 26. The above-described procedure is repeated synchronous with the rotation of the polygonal mirror 4, whereupon the FIFO memory 27 is similarly loaded in an ordered sequence with computed values C respectively associated with the reflecting surfaces of the polygonal mirror 4 which come to be located at the measure position in succession as the mirror 4 rotates. In addition, the scan timing signals obtained as the polygonal mirror 4 rotates are delayed by counting in the shift register 30, whereupon the scan timing signal delayed by three scan cycles (see above) is input to the D/A converter 28; at the same time, the digital data in the FIFO memory 27 is read out as a voltage representing the computed value C. On this occasion, the reflecting surface R2 in measure position is rotated to the scan position where the laser light from the laser diode LD is reflected for scanning, namely, to the position of the reflecting surface in scan position R1.

The output voltage from the D/A converter 28 is input as the reference voltage Vref to the comparator 13 in the laser output control circuit 10 and compared with the detection voltage from the monitoring photodiode PD. Suppose here a constant detection voltage from the monitoring photodiode PD. If the reflecting surface in measure position R2 has high reflectance of laser light, the computed value C is smaller than te set value CO, and thus the reference voltage is shifted to the lower end. When a comparison is made at the point of time when the reflecting surface R2 has been moved to the scan position, the comparison voltage from the comparator 13 is comparatively decreased, if it is sampled and held and subsequently input to the laser drive circuit 15, the drive current to the laser diode LD is corrected to a smaller value. This means that if the reflecting surface in measure position, namely, the reflecting surface currently in the scan position, has a comparatively high reflectance of laser light, the optical intensity of the laser light emitted from the laser diode is lowered. Consequently, the optical intensity of the laser light reflected from the reflecting surface is held at a specified value. Conversely, if the reflecting surface in measure position R2 has a comparatively low reflectance of laser light, the computed value C is larger than the set value CO, and thus the reference voltage derived from the computed value C is large, the comparison voltage from the comparator 13 is increased, and the drive current to the laser diode (which is supplied from the laser drive circuit) is corrected to a greater value. The optical intensity of laser light from the laser diode LD toward the reflecting surface in scan position is increased and, consequently, the optical intensity of the laser light reflected from the reflecting surface is held at the specified value.

Figure 3:
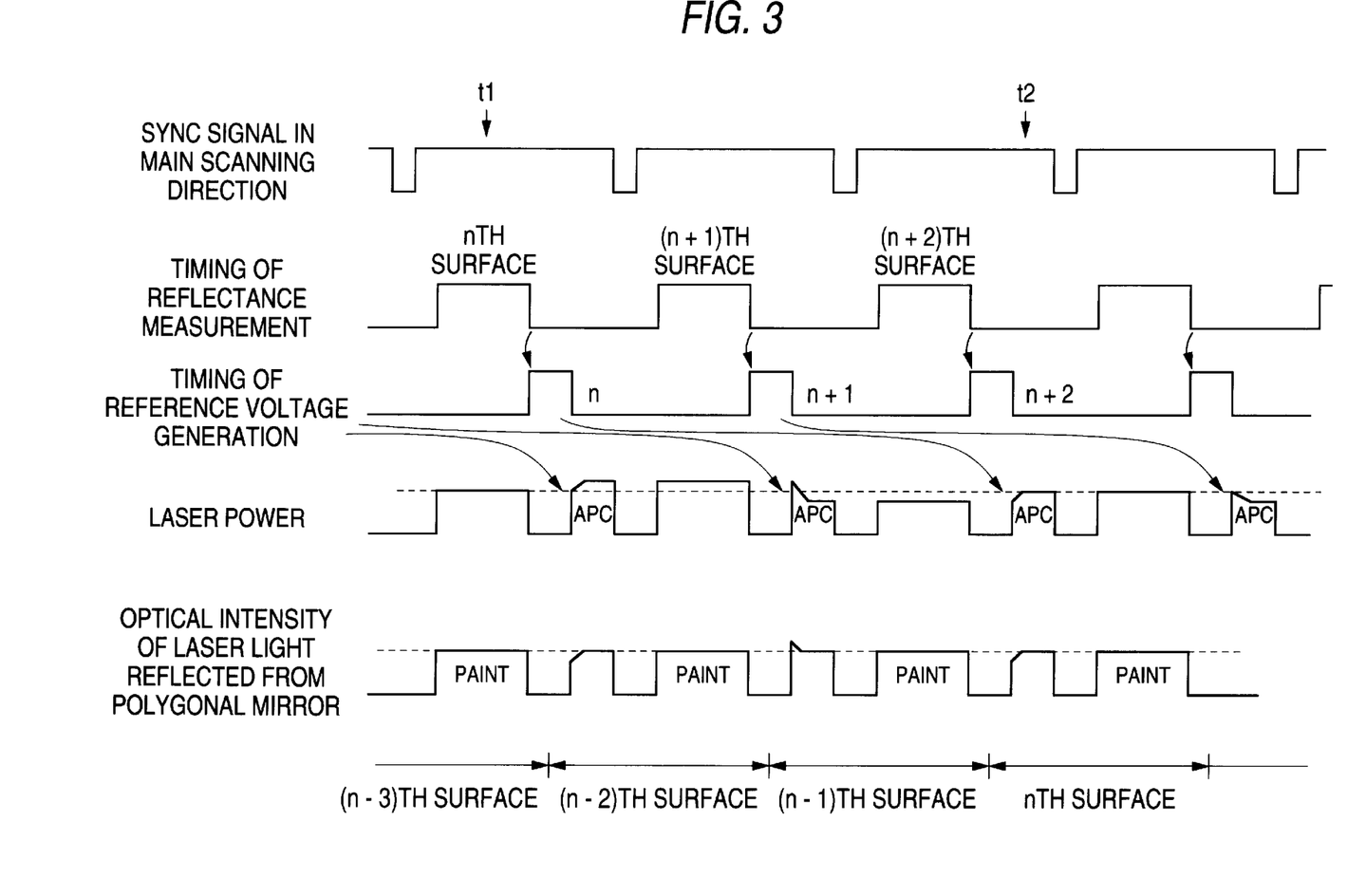
FIG. 3 is a timing chart describing the operation of APC by the apparatus.

FIG. 3 is a timing chart describing the APC operation outlined above. Suppose that scanning with laser light is performed at the (n−3)th reflecting surface of the polygonal mirror 4 at time t1; reflectance measurement is simultaneously conducted at the nth reflecting surface which is diametrically opposite the (n−3)th surface. At subsequent time t2 when the polygonal mirror 4 is rotated to bring the nth reflecting surface to the scan position, the optical output of the laser diode LD is controlled on the basis of the previously measured reflectance. The thus controlled laser light is reflected by the nth reflecting surface for scanning.

Stated more specifically, FIG. 3 shows the case where four adjacent reflecting surfaces of the polygonal mirror 4, namely, the nth, (n−1)th, (n−2)th and (n−3)th surfaces, have reflectances of laser light R(n), R(n−1), R(n−2) and R(n−3), respectively, which satisfy the relation R(n−2)<R(n)=R(n−3)<R(n−1). Hence, compared to the laser output from scanning at the nth reflecting surface, the laser power of the laser diode LD is increased during scanning at the (n−2)th surface, reduced during scanning at the (n−1)th surface, and which is equal during scanning at the (n−3)th surface. As a consequence, the optical intensity of the laser light reflected from each reflecting surface is controlled at the specified level.

Figure 5:
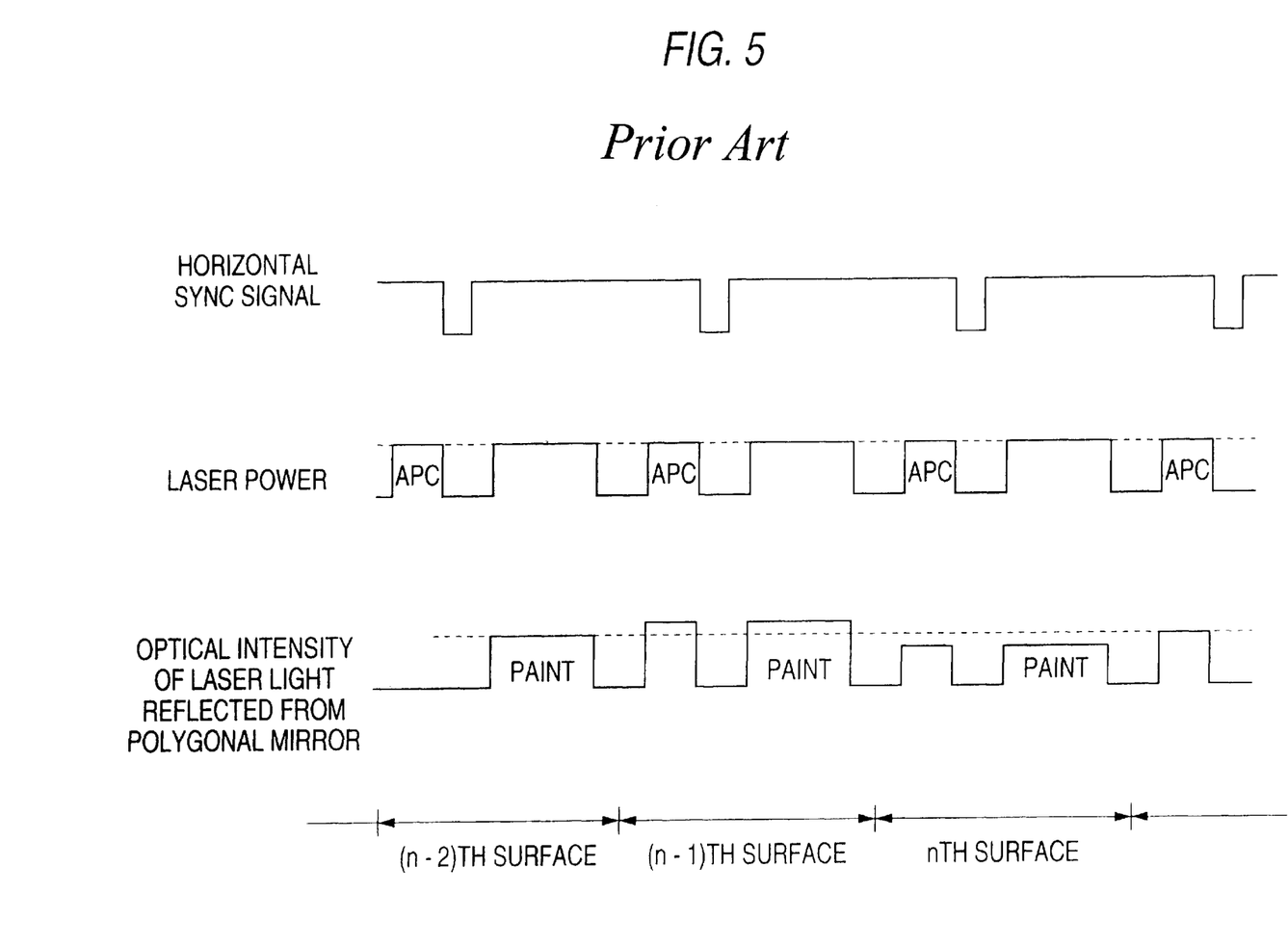
FIG. 5 is a timing chart describing the operation of APC by the APC circuit shown in FIG. 4.

Thus, the reference voltage Vref is generated on the basis of the reflectance of laser light for each reflecting surface of the polygonal mirror 4 as measured with the reference voltage generator circuit 20, synchronous with the timing at which the reflecting surface for which the reflectance measurement has been made is rotated to the scan position, laser power control is performed on the basis of the generated reference voltage Vref; this ensures that the optical intensity of laser light reflected from the polygonal mirror 4 is controlled at a specified level. Despite variation in the reflectance of laser light from each reflecting surface of the polygonal mirror, the optical intensity of laser light can be controlled to be uniform at each of the scan lines on the photoreceptor drum, whereby uniform image density is produced at each scan line to realize the drawing of a high-quality image. It is interesting to refer to FIG. 5, which is a timing chart describing the control of laser power by the APC circuit shown in FIG. 4. Obviously, the laser power of the laser diode can be controlled at a constant level; however, due to the variation in the reflectance of laser light from each reflecting surface of the polygonal mirror, there occurs a corresponding variation in the optical intensity of the laser light scanning the surface of the photoreceptor drum. The resulting variation in density between individual scan lines makes it difficult to achieve image drawing at uniform density.

In the apparatus described above, the reflecting surface of the polygonal mirror for which the reflectance of laser light is to be measured is shown to be positioned diametrically opposite to the reflecting surface in the process of scanning with the laser light; however, this is not the sole case, and reflectance measurement may be performed on the reflecting surface in another rotational position, such as the one which just precedes the reflecting surface in the process of laser light scanning. In this example of the alternative case, laser power control in the next scan may be performed on the basis of the value of reflectance measured on the surface which just precedes the reflecting surface in the process of laser light scan. Hence, output control can be performed using the scan timing signal. As such, and the shift register, the FIFO memory and like components used in the apparatus described above can be eliminated, which is advantageous for the purpose of simplifying the overall circuit configuration. It should, however, be noted that if the reflecting surface just preceding the one in the process of laser light scan is to be subjected to reflectance measurement, the space for installation of the measuring laser diode and photodiode is most likely limited. In order to ensure latitude in the installation of these diodes, the reflecting surface to be subjected to reflectance measurement is preferably located either opposite or near the measuring laser diode, as is the case of the apparatus described hereinabove.

In the apparatus, the measuring laser diode MLD is supplied with a constant current so that the optical intensity of laser light it emits is set to be constant. The reflectance of laser light for one of the reflecting surfaces of the polygonal mirror is measured in terms of the detection current from the measuring photodiode MPD. If it is necessary to compensate for the variation in the emission output of the measuring laser diode MLD, one may detect the current from the constant-current circuit 21 such that the detection current from the measuring photodiode is corrected with the detected current for subsequent calculation in the comparing/computing device 24. This contributes to enhance the precision in either the measurement of reflectance or the reference voltage.

In the apparatus described above, there may be a case that the optical intensity of the laser beam emitted to the reflecting surface is controlled by the laser beam output control circuit 10 before the reflectance measurement is carried out for that reflecting surface, in particular, at startup of the apparatus. To deal with this case, the reference voltage generator circuit 20 may be arranged to output a general reference voltage to the comparator 13, which can be commonly used as a reference value for any one of the reflecting surfaces of the polygonal mirror 4, when the reference voltage generator circuit 20 cannot output a reference voltage Vref obtained through the actual relfectance measurement using the measuring laser diode MLD and the measuring photodiode MPD.

As described on the foregoing pages, the laser scan based recording apparatus is adapted to be such that each of the reflecting surfaces of a polygonal mirror with which the laser light emitted from a laser light source is reflected for scanning is measured for the reflectance of laser light. This generates a reference voltage associated with the measured reflectance. When the laser light is to be reflected by each reflecting surface for scanning, the emission output of the laser light source is subjected to APC on the basis of the generated reference voltage. Because of this design, the optical intensity of the laser light reflected from the polygonal mirror can be controlled at a specified level and the variation in optical intensity among a plurality of scan lines on the photoreceptor is effectively eliminated to provide uniform image density, thereby realizing the drawing of high-quality images. In addition, the system is not of such a type that APC is performed on the basis of the detection output of the photosensor which detects the scanning laser light and, hence, the laser power is subjected to positive APC at all times. The overdrive of the laser diode is thereby effectively prevented to protect it against breakdown, and to produce consistent and highly reliable laser power control.

What is claimed is:

1. A laser scan based recording apparatus in which laser light emitted from a laser light source is reflected by a polygonal mirror having a plurality of reflecting surfaces to scan a photoreceptor, said apparatus comprising:

a system which measures reflectance of laser light for each of the reflecting surfaces of said polygonal mirror and generates a reference voltage associated with the measured reflectance;

an emission output control system which controls emission output of said laser light source on the basis of said generated reference voltage when laser light is reflected at a reflecting surface of said plurality of reflecting surfaces for which the reflectance of laser light has been measured;

said emission output control system including a monitoring photodiode for detecting an optical intensity of laser light emitted from said laser light source toward one of said reflecting surfaces; and said reflectance measuring system including a measuring laser diode for projecting light onto another one of said reflecting surfaces and a measuring photodiode for receiving the light reflected by said another one of said reflecting surfaces.

2. The laser scan based recording apparatus according to claim 1, further comprising:

a timing control system for activating said reflectance measuring system and said emission output control system so that said reflectance measuring system measures the reflectance of the laser light for one of said reflecting surfaces when said emission control system controls the emission output of said laser light source for the laser beam being emitted onto another one of said reflecting surfaces.

3. The laser scan based recording apparatus according to claim 2, wherein said timing control system includes a photosensor for detecting said laser light reflected by said polygonal mirror before said laser light scans said photoreceptor, and provides a scan timing signal.

4. A laser scan based recording apparatus comprising:

a laser diode;

a rotatably driven polygonal mirror having a plurality of reflecting surfaces for directing laser light emitted from said laser diode to scan a photoreceptor;

a light emitter for projecting reflectance measuring light on one of said reflecting surfaces;

a light receiver for detecting the reflectance measuring light reflected from said one of said reflecting surfaces;

means for generating a reference voltage associated with the reflectance measuring light of said one of said reflecting surfaces on the basis of the reflectance measuring light received by said light receiver, whereby a reflectance of said one of said reflecting surfaces is measured; and a laser output control circuit for controlling an emission output of said laser diode on the basis of said generated reference voltage when laser light is scanned at said one of said reflecting surfaces;

wherein the reflectance of laser light is measured for a reflecting surface positioned at least one surface upstream in a direction of rotation with respect to another reflecting surface located at a laser light scanning rotational position;

wherein said laser scan based apparatus further comprises means for outputting a scan timing of said laser light; and wherein said means for generating a reference voltage outputs the reference voltage to the laser output control circuit at such a time that the reflecting surface for which the reflectance of laser light has been measured on the basis of said scan timing output is rotated to a scanning position.

5. The laser scan based recording apparatus according to claim 4, wherein the laser output control circuit comprises:

a monitoring photodiode for detecting optical intensity of the laser light emitted from the laser diode;

an error comparator for comparing the detection output of said monitoring photodiode with said reference voltage to output an error voltage; and a laser drive circuit for controlling drive current fed to said laser diode in association with said error voltage.

6. The laser scan based recording apparatus according to claim 4, wherein the reference voltage generating means comprises:

a circuit for comparing the detection output of the light receiver with a reference value and performing a predetermined calculation;

means for storing a value obtained by said predetermined calculation; and means for reading the stored value at a timing synchronous with rotation of the polygonal mirror and outputting said read value as said reference voltage.

7. The laser scan based recording apparatus according to claim 4, wherein said means for outputting the scan timing of said laser light includes a photosensor for detecting the laser light as it is reflected by the polygonal mirror.

8. A process for adjusting optical intensity of a laser beam emitted from a laser power source to a photoreceptor using a n-th surface of a rotating polygonal mirror, where n is a positive integer, to draw an image on the photoreceptor, said process comprising:

detecting a reflectance of the n-th surface when the laser beam is not emitted from the laser power source onto the n-th surface, and providing an output indicative of the reflectance;

creating a reference value based on the output;

emitting the laser beam from the laser power source onto the n-th surface;

detecting an optical intensity of the laser beam emitted from said laser power source toward the n-th surface using a first photodetector; and carrying out a feedback control by comparing an output from the first photodetector with the reference value.

9. A process according to claim 8, wherein said detecting reflectance includes:

emitting a light from a laser diode onto the n-th surface; and receiving the light reflected by the n-th surface with a second photodetector.

10. A process according to claim 8, further compising:

between said creating and emitting, storing the reference value in a memory, and reading out the same therefrom.

11. A process according to claim 8, further comprising:

emitting the laser beam onto an image draw area of the photoreceptor while maintaining optical intensity of the laser beam controlled and set through the feedback control during the carrying out.

12. A process according to claim 8, wherein said detecting reflectance when the laser beam is emitted from the laser power source onto one of reflecting surfaces of the polygonal mirror other than the n-th surface.

* * * * *